United States Patent [19]
Achterholt

[11] Patent Number: 5,557,256
[45] Date of Patent: Sep. 17, 1996

[54] TIRE PRESSURE LOSS INDICATING DEVICE

[75] Inventor: Rainer Achterholt, Weidach, Germany

[73] Assignee: Auto-Zubehör-Innovationen Gasellschaft mbH, Pertlstein, Austria

[21] Appl. No.: 236,508

[22] Filed: Apr. 29, 1994

[30] Foreign Application Priority Data

Apr. 30, 1993 [DE] Germany .................. 43 14 340.7

[51] Int. Cl.$^6$ ................................. B60C 23/00
[52] U.S. Cl. .......... 340/442; 340/445; 340/448; 73/146.4; 73/146.5; 73/146.8; 116/34 R; 200/61.22
[58] Field of Search ................ 340/442, 445, 340/448; 73/146.4, 146.5, 146.8; 116/34 R, 34 A, 34 B; 200/61.22

[56] References Cited

U.S. PATENT DOCUMENTS

| | | | |
|---|---|---|---|
| 4,658,644 | 4/1987 | Coesfeld et al. | 73/146.8 |
| 4,819,686 | 4/1989 | Achterholt | 73/146.8 |
| 5,025,244 | 6/1991 | Huang | 340/442 |

Primary Examiner—Donnie L. Crosland
Attorney, Agent, or Firm—The Firm of Gordon W. Hueschen

[57] ABSTRACT

A valve cap is screwed onto a pneumatic tire and generates an indication whether a prefilled tire pressure is still existent or not. For this purpose a valve cap (1) comprises a deflectable diaphragm (30) in an inner housing separating a pressure chamber from a reference pressure chamber. The reference pressure chamber registers the prefilled tire pressure. The diaphragm (30) is deflected toward the closed housing end when the actual existent tire pressure drops in comparison with the registered tire pressure. Onto the diaphragm (30) a permanent magnet (40) is placed, which can be in a first position (normal position of the diaphragm) or in a second position adjacent to the housing end. The check of the magnet position and the generation of an indication signal indicative of the actual tire pressure status will be executed by a hand device, which must be brought into a defined position with respect to the valve cap. The hand device comprises at least one magnet field sensor and an indicating device which generates an optic or acoustic signal to register the tire pressure status at the time of the tire check.

18 Claims, 5 Drawing Sheets

TIRE PRESSURE LOSS INDICATING DEVICE

The invention relates to a pressure loss indicating device for pneumatic tires, equipped with a tire valve. This kind of pneumatic tires are especially used for vehicle tires as used for cars, vans, trucks, buses, heavy duty/industrial vehicles, air planes and motor cycles.

In particular the invention covers a tire pressure loss indicating device according heading claim 1. A tire pressure loss indicating device of this kind is known under German Patent Nr. 36 00 830. After having screwed on a valve cap closely onto a valve tube and the fire valve is opened by means of an actuator member, the tire pressure deflects the diaphragm corresponding to the existing prefilled tire pressure. The pressure into the tire and the pressure into the pressure chamber might differ extremely, causing a relative mechanic deflection of the diaphragm.

The actually deflection of the diaphragm is dependent on the difference of the pressures and the mechanical constitution of the diaphragm. The deflection results in a relative shifting movement of the permanent magnet.

The magnet field sensor registers the distance of the permanent magnet to a reference level and translates this distance to a pressure rating by digital indication. Even changes in a distance of $1/100$ mm affect and vary the pressure indication. To achieve reproducible results an accurate handling and calibrating in valuation and control of the hand checker to the deflection of the diaphragm will be required. In addition the hand checker must be in a defined position to the valve cap.

Furthermore the German patent Nr. 41 16 709 discloses a valve cap with pressure drop indication for pneumatic tires, equipped with a valve with a valve tube. To this valve cap belongs:

a housing with a closed housing end, comprising a transparent housing portion, in addition with an open housing wall and with an open housing end to be screwed onto a valve tube, at which the closed housing end and the housing wall enclose an inner space, a sealing element, to close the open housing end to the valve tube, an actuator member to open the tire valve, a deflectable diaphragm, dividing the housing interior into a pressure chamber adjacent to the closed housing end to a reference pressure chamber adjacent to the housing wall, whereby the pressure chamber is in a permanent flow connection to the tire valve by at least one port which cannot be closed and the reference pressure chamber is in flow connection to the tire valve by a port in the housing wall which can be closed.

The characteristic is, that the sealing element will be deformed at the screwing operation in a way, that the port of the housing wall will be closed. This known valve cap functions in a way that when screwing on the valve cap onto the valve tube, at first the open housing end will be closed to the valve tube, followed by an opening of the valve to the valve cap by an actuator member and the existing (initial) tire pressure fills both, the pressure chamber and the reference pressure chamber and after this operation the reference pressure chamber will be closed hermetically. A later drop in tire pressure will deflect the diaphragm by the difference in pressure between the actual tire pressure in the pressure chamber and the 'registered' tire pressure (originally filled pressure) of the reference pressure chamber, by a deflection of the diaphragm to the transparent housing section, being used as a pressure loss indication.

At common used versions of this known valve cap the maximal deflection of the diaphragm is some $1/10$ mm.

To improve the interpretation of the deflection of the diaphragm, an additional sliced covering foil rising like a crown was provided therefore, and a preferably colored diaphragm will get visible through an aperture caused by the deflected diaphragm position.

But also by this center opening cover-foil the optical output of a YES/NO information is rather poor. To monitor a pressure loss it would be desirable to better the optical output.

But a better output is limited by the small dimension disposable in a valve cap with an exclusively mechanic movement of the indicating components.

The target of this invention is to cover a tire pressure loss indicating device of this kind which is more simple, doesn't need any calibration and allowing a simple YES/NO information, whether the actual existing tire pressure corresponds with the prefilled one or not.

According an additional target of the invention an elements protection will be applied for the special configuration of the valve cap, being a fundamental part of this inventive tire pressure loss indicating device.

This task is solved by the characteristics and features as more particularly set forth in the claims.

The inventive valve cap represents the characteristics as more particularly set forth in the claims.

This inventive tire pressure loss indicating device operates in a way, that, when screwing on the valve cap onto the valve tube, the open valve cap housing closes first to the valve tube. At a next step the tire valve will be opened by an actuator member and the prefilled tire pressure (nominal pressure set) flows to both the chambers, the chamber pressure and the reference pressure chamber, integrated into the valve housing. Continuing to screw the reference chamber will be closed hermetically and permanently by a deformable sealing element. In the case of a pressure drop the difference in the pressure of the tire to the prefilled 'registered' pressure value to the reference chamber pressure causes a deflection of the diaphragm towards the closed end of the valve cap housing. Due to this movement the permanent magnet will be shifted from a first position to a second position.

To check the actual tire pressure status (originally filled pressure or pressure loss) the hand checker will be brought to a defined position to the valve cap. The magnet field sensor into the hand checker locates the existing position of the magnet and executes an indication control. The indicating device allows an excellent, clear YES/NO information, whether the existing tire pressure corresponds to the prefilled tire pressure or not. The indicating device for example may operate by use of light emitting bulbs or diodes providing for an optical signal or by use of piezo-summers for an acoustic warning. Helpful features and further developments follow from the sub-claims.

For example it may be preferably provided a distance between the first and the second magnet position of 0,3 to 0,9 mm. The preferably distance may be approx. 0,5 min.

For the inventive aimed YES/NO information of the indicating device this small distance between the two magnets will be fully sufficient. This little shift of the magnet allows a high sensitive reaction of the diaphragm to a change of pressure. It is allowable to use materials and dimensions of a diaphragm, showing a deflection of 0,5 mm caused by a pressure drop of 0,1 bar only. This means, that at a pressure loss of approx. 0,1 bar is easily and safely noticeable by this invention. Due to the fact, that the diaphragm needn't be colored for a better signaling, it is possible to select the material of the diaphragm without any restriction in the elastic constitution and the permanent density. Owing to the little movement of the magnet. Hit is possible to shorten the tenth of the valve cap construction.

A further preferably application is the use of a magnet sensor as an one-pole hall effect position sensor. Such an one-pole hall effect position sensor switches at the presence of a positive flux density (south pole). At a reduction of said positive flux it will be switched off. An one pole hall effect position sensor as used has a standard switch on level of 15 mT and a standard switch off level of 11 mT (millitessla) at a temperature of +25° C. This kind of sensor is a temperature compensated hall effect sensor, consisting of a 4-fold hall element, placed in the center of a chip.

Thermo-welded bonded wires connect the chip electrically to the contact frame. The chip is placed in a glass fiber, fortified, temperature hardened plastic, and shows constant magnetic data's in a temperature range from approx. –40° C. to +125° C. The distance in between an activating is possible at a sufficient positive flux intensity may be several ¹⁄₁₀ mm, for example up to 0,3 mm.

This allows a sufficient tolerance margin to position the permanent magnet and the sensor and for the defined adaptation of the hand checker to the valve cap avoiding false indications. This kind of one pole hall effect position sensors are customary in the trade.

A further advantageous feature is the design of the valve cap housing, preferably constructed in particular as a cylindrical, step-graduated, with a closed tube at one end, with an annular grade in between the narrow closed housing end and a wider open housing end.

This cylindrical valve cap housing consists preferably of metallic material, for example of an aluminum, aluminum alloy, brass or steel, showing none or only little ferromagnetic attributes. Furthermore the valve cap housing may be made of plastics. An ideal material is sintered polyimid particles, owing to its high stability and a wide temperature range of –200° C. to +300° C.

The hand checker housing is preferably built of longish design (cylindrical or generally bottle like) showing at least one front side. The touch area is placed at this front side, consisting of a tube portion to be slipped onto the annular step at the narrower side of the valve cap housing at its defined checking position. This tube section of the hand checker housing may consist of aluminum, for example. As soon as the hand checker housing is fully attached to the graduated step onto the valve cap housing, a firm defined positioning of the hand checker to the valve cap is warranted rather simple. The magnet field sensor of the hand checker is situated in a definitive position to register the distance of the permanent magnet into the valve cap housing.

According to a further advantageous application of the invention it is provided to locate this defined position of the valve cap by the sensor of the hand checker. This positioning sensor generates an output signal, controlling an optical and/or acoustical indication at a special defined position. For this positioning sensor a reed contact may be used, reacting to the two positions of the permanent magnet into the valve cap generating a positive output signal at a defined position. This reed contact element also activates the magnet field sensor in the case of a defined position. In this case an additional switch or push-button will not be necessary to activate the control unit.

At a further advantageous application the hand checker housing may be constructed of two parts with two housings, moveable telescopic by the load of a spring. At this application the attachment of the measuring head of the hand checker onto the valve cap is to be executed under a light pressure, defined by the load of the spring. By this procedure the positioning of valve cap to the measuring head will be improved. In this case it may be also provided, that during the moving procedure of the two housing parts an electric contact will be disconnected or connected, by which the electric/electronic components (magnet field sensor, control switch, indicating device) of the hand checker will be supplied with power. When the hand checker is out of use, the power source is disconnected safely from the power consuming components. Furthermore, no additional switch is necessary to activate the magnet field sensor and the indicating control.

As another advantageous application of this invention the hand checker may be completed with a checking device (template), by which it is possible to find out, if a tire valve, onto which the valve cap will be screwed onto is a standard valve or not.

During the screwing on procedure the subsequent steps will be as follows:

sealing of the open end of the valve cap to the tube of the tire valve.

Opening of the tire valve by pressing down the actuator member of the valve cap.

Flow of the tire pressure into the pressure reference chamber and the pressure chamber of the valve cap and hermetically dense closing of the reference chamber.

This sealing in 3 steps is described more accurate in patent DE 35 46 338 C1. This operation will be executed during some turns of the threads of the valve cap. The required result is achievable only at a standard position of the valve tappet. These standards are documented f.e. in DIN 7757 (draft of Sep. 1984) As to this draft description the end of the valve tappet front must be a maximum of 0,9 mm down or 0,25 mm up of the upper open end of the valve tube.

To check this standard of a tire valve in order to be sure that the valve cap screwed onto the tire valve would open this tire valve a template can be provided on the hand checker housing by a hole with an actuator member inside to push down the valve tappet.

This template can be placed f.e. on the other end of the hand checker housing. For this test the valve tube will be inserted into the hole as long as the valve tube end is fully in touch with the bottom of the hole of the template. In the event, the valve tappet will be pushed down by the actuator member of the template, a pressure flow is notable by a hissing sound which will be heard, well, conforming that the tire valve corresponds to a standard valve an will allow to open the valve by the valve cap thoroughly.

In a further advantageous application the sealing element—responsible for the sealing of the open housing end of the valve cap to the valve tube of a tire valve—is of one unit/piece and will be deformed during the screwing on procedure. Furthermore the deformed sealing element is used to close the port(s) in the housing wall in order to close the reference chamber hermetically and permanently.

When screwing off the valve cap from a tire valve, the deformed sealing element goes back to its former shape, reopening the port(s) in the housing wall. The reference pressure chamber will be open ad again. This makes it possible that the valve cap is reusable and can be used for any other prefilled pressure value. This feature of a valve cap allows an universal use of one valve cap for the whole pressure range, the valve caps are interchangeable. This is an important advantage in comparison to other known systems, where a valve cap is pre calibrated to a fixed pressure level.

The present invention of a valve cap with pressure loss indicating device is mainly composed of the following components and features:

an at one side closed valve cap housing and a housing wall, both limiting an inner space and with an open valve cap housing end, to be screwed onto a tire valve tube;

a sealing element in order to close the open valve cap housing to the tire valve;

an actuator member to open the tire valve;

a diaphragm, dividing the interior into a pressure chamber adjacent to the closed cap housing end and a reference pressure chamber adjacent to the housing wall, being deflectable relative to the actual tire pressure;

a permanent magnet, positioned in a moveable way being shifted at a deflection of the diaphragm into the pressure chamber this permanent magnet is in a first position adjacent to the housing wall and in a second position adjacent to the closed housing end;

the pressure chamber being in a flow connection to the tire valve by at least one port, which cannot be closed.

the reference pressure chamber is in flow connection the tire valve by one or more port(s) which can be closed; and the port(s) in the housing wall will be closed hermetically and permanently during the screwing on operation.

In the following chapter the invention will be explained by preferred versions with reference to the figures; these are demonstrating:

Figure 3:
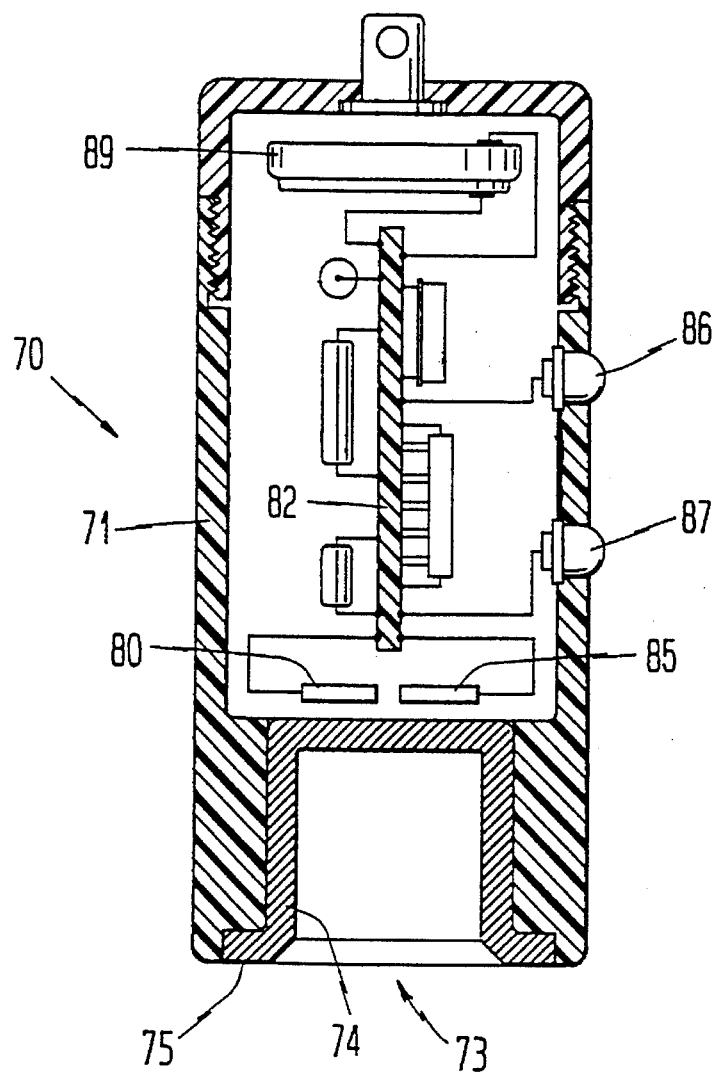
FIG. 3 in a schematic intersection a first application of a hand checker adapted to the valve cap according FIG. 1, the use thereof allowing to interrogate ,whether the tire disposes of the prefilled pressure or not.
Figure 5:
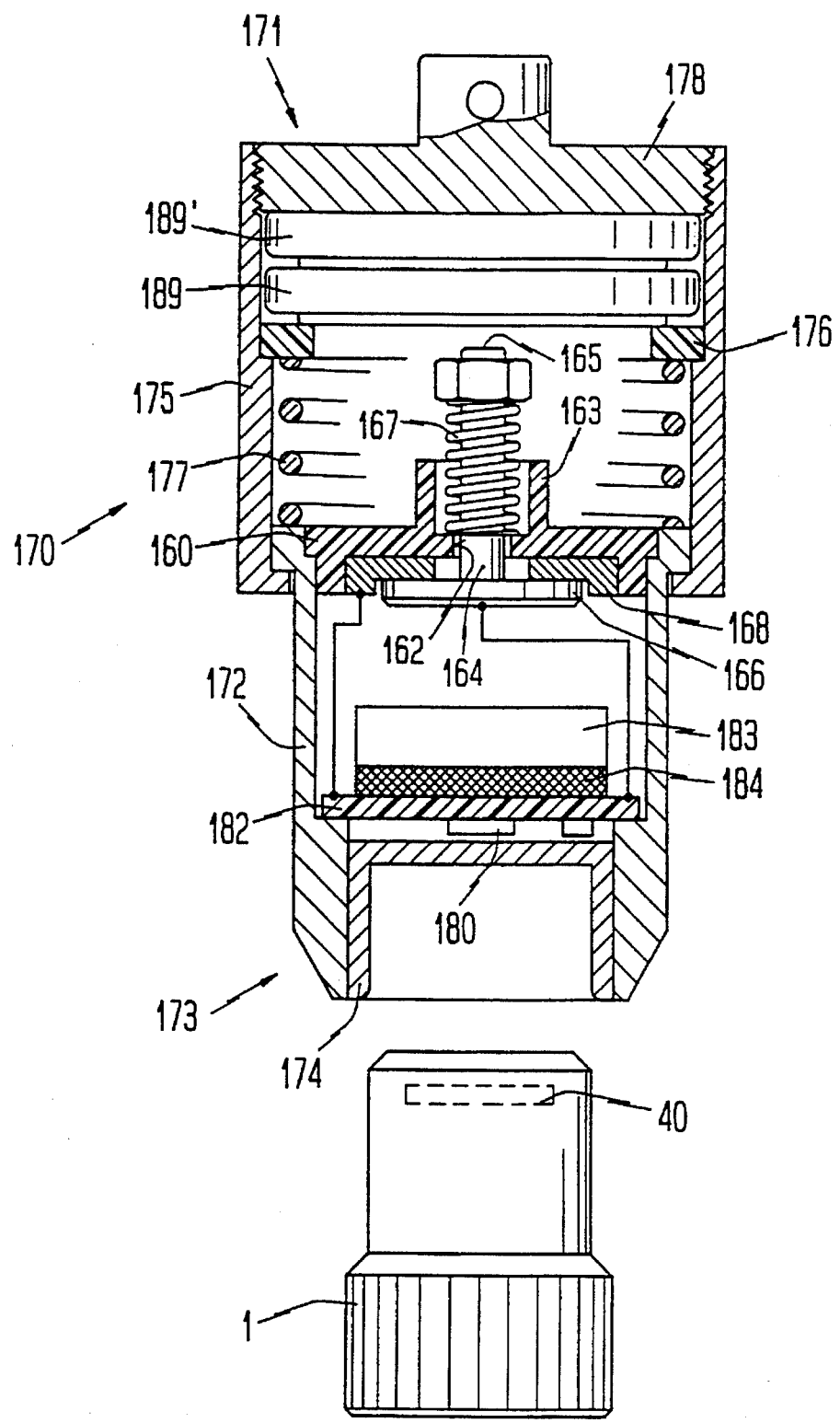
FIG. 5 in a schematic intersection a second application of a hand checker adapted to the valve cap according FIG. 1.

The tire pressure loss indicating device according to the invention exists of a valve cap 1 and a hand checker 70 (170) with an indicating device 86,87 (183) (compare FIG.3 or 5). The valve cap will be placed onto the tube of a tire valve, and in doing so the valve tappet will be pressed down and the tire valve will be opened.

The inner of the valve cap 1 consists of a permanent magnet 40, able to be situated in two different positions. The position of the magnet will be interrogated by a hand checker 70 (170)and indicated in an acoustically or optically visible signal.

Figure 1:
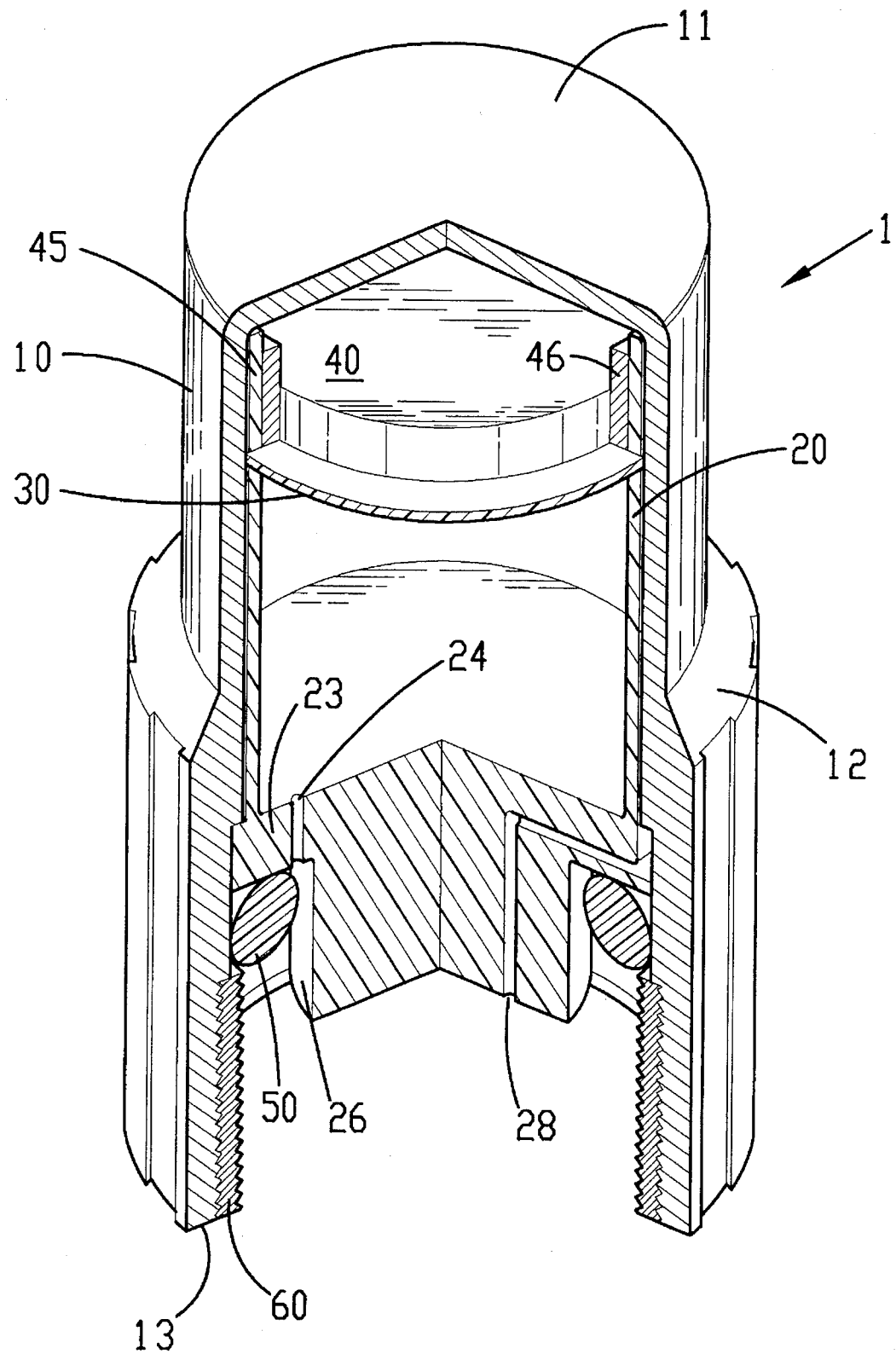
FIG. 1 a foreshortened, perspective design of a valve cap according to the invention.
Figure 2:
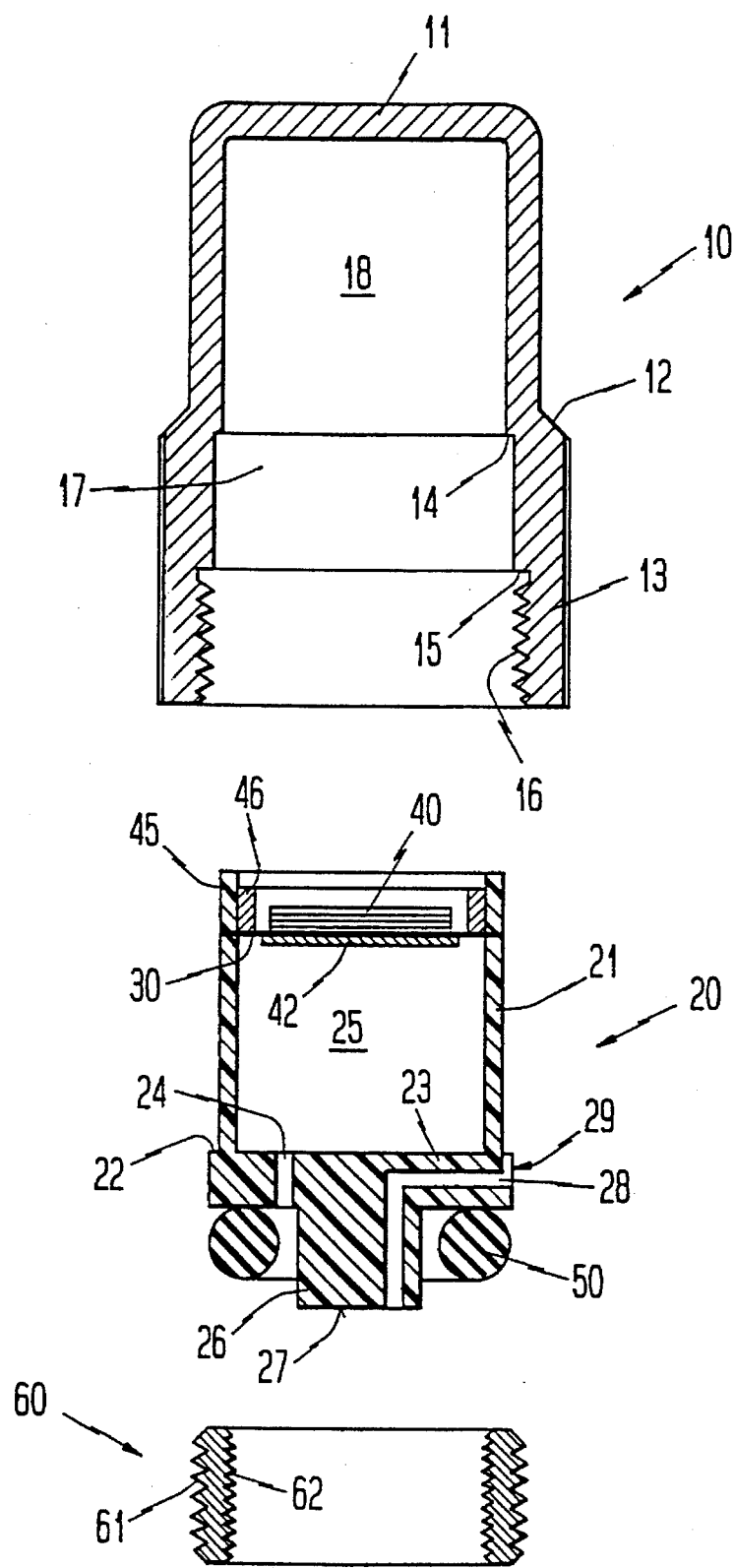
FIG. 2 in an asunder drawn schematic sectional drawing showing the various components of the valve cap according FIG. 1.

The valve cap 1 shown at FIG. 1 and 2 illustrate in general a metallic valve cap housing 10, and a measuring unit 20 to be inserted into this valve cap housing, and a deflectable diaphragm 30 adjusted together with a permanent magnet, and the actuator member 26. In addition there is provided a sealing element 50 and a threaded ring 60.

The housing 10 preferably exists of a step graduated metal tube, made of aluminum respectively aluminum alloys, brass or high-grade steel with low ferromagnetic ratings.

Housing 10 shows a closed narrower housing end 11 and a wider open housing end 13, in between this an annular step is provided. Onto the inner wall of the wider housing section 13 there are formed a first annular step 14 and subsequently a second annular step 15.

To the second annular step 15 follows an inner thread section 16. The complete valve cap housing 10 limits a housing interior 17 whereof the upper portion contents a pressure chamber 18.

In this inner housing 17 a measuring unit 20 is placed, as visible according FIG. 2. This measuring unit 20 is generally composed of an annular, cylindrical tube wall 21, arising from the housing wall 23, situated in the main vertically to a valve cap longitudinal axis and expiring a little the volume of the tube wall 21 in a way that an armular shoulder 22 is formed. From the opposite side of the housing wall 23 an actuator member 26 arises—constructed basically as a cylindrical tappet—located in a rotation-symmetric configuration to the longitudinal axis of the valve and formed one pan of the housing wall 23. The housing wall 23 provides a through port 24. The cylindrical formed tappet 26 acting as an actuator member 26 shows a piston front side 27 onto which the valve tappet of a tire valve will be pressed during the screwing on operation and continuously pressed down more and more during this procedure causing the opening of the tire valve.

Into the body of the actuator member 26 and the housing wall 23 interconnecting ports are constructed providing a port 28 which cannot be closed, beginning at the piston's front side 27, running throughout the body of the piston 26 and the housing wall 23 with the exit at a position 29 of the housing wall 23; this cannot be reached by the deformable sealing element 50.

In a distance to the housing wall 23 a deflectable diaphragm 30 is placed onto the annular tube wall 21 and connected pressure dense to the tube wall 21, for example sticked there with its circular end section.

This diaphragm 30 is characterized by a high degree of elasticity and a minimum gas diffusion and may be made of natural Lastex. Even a pressure difference of 0,1 bar between the two sides of the diaphragm makes possible a dear diaphragm deflection of at least 0,5 min.

The measuring unit 20 shows a clearance dimension allowing to insert it into the housing 17 until the annular shoulder 22 is art ached to the measuring unit 20 at the first annular step 14 of the inner housing. It remains a sufficient space above the diaphragm 30, used as pressure chamber 18, towards which the diaphragm 30 is deflectable, as soon as the pressure into the reference chamber 35 is higher than this one in pressure chamber 18. In between the outer surface of the tube wall 21 and the inner wall of the narrower housing section 11 a sufficient space is provided to allow a pressure flow from the pressure chamber 18 to the tire by the tire valve throughout the port 28, which cannot be closed. Furthermore there is provided a thread ring 60—preferably made of brass—showing onto the outer diameter an outer thread 61 and on the inner side an inner thread 62. The inner thread 62 is preferably a standard thread G 8, to be screwed onto the typically provided outer thread of a valve tube used for all kind of standard tires. After having inserted the measuring unit 20 into the housing interior 17, the threadring 60 will be screwed by its outer thread 61 into the thread of the inner housing 16 at the inner wall of the housing section 13 as long as the thread ring 60 is firmly placed with its front side to the housing wall 23. By this method a stable and firm positioning of the measuring unit 20 and the thread ring 60 in the housing interior 17 of the valve cap housing 10 is warranted. Furthermore it is possible to provide an adhesive f.e. 'Locktite' to lock the thread ring 60 for security purposes. Last not least there is provided an elastic deformable sealing element by an O-ring 50. Preferably this O-ring shows a circular diameter. The outer diameter of the O-ring 50 is smaller than the inner diameter of the thread ring 60, allowing to place the O-ring into the thread ring 60, and to be inserted till the O-ring 50 is attached to the outer side of the housing wall 23. The inner diameter of the O-ring 50 is of a larger than the outer diameter of the cylindrical formed piston 26, allowing piston 26 to stand out through the clearance of the inner space of the O-ring 50 and beyond the O-ring 50 level. Typically O-ring 50 disposes of a diameter considering the diameter of a typical tire valve, allowing to seal the valve cap 1 to the tire valve between the valve tube end side and the outer face of the housing wall 23. The selection of the dimension of the O-ring 50 and the cylindrical piston 26 and port 24 was done in a way that port 24 never can be closed by a not deformed O-ring.

At the screwing operation of the valve cap 1 on to the valve tube of a typical tire valve a 3-steps sealing is executed, more detailed described in document DE 35 46 338 C1. In a first step of the screwing procedure the O-ring 50 will be pressed in between the end portion of the tire valve and the outer face of housing wall 23, causing a dense sealing between the open housing end 5 of the valve cap 1 and the tire valve tube. Continuing the screwing procedure the actuator member 26 presses down the valve tappet and opens the tire valve to the tire; allowing the flow of the pressure medium of the tire in a balance of the existing pressure into the valve cap inner space 17 and filling both, the reference chamber 25 and the pressure chamber 18 with the prefilled tire pressure.

Finally—continuing the screwing procedure—in a third step the O-ring 50 will be deformed in a way that it provides for a closing of port 24 of the housing wall 23 hermetically and permanently.

Diaphragm 30, the annular tube wall 21 and the housing wall 23 limit a reference pressure chamber 25, which is fillable with the prefilled tire pressure (nominal tire pressure) by port 24, after the tire valve has opened. As soon as port 24 is closed the reference chamber 25 is filled with the prefilled tire pressure thus registering the prefilled corrective pressure.

In the event, the pressure on the other side of the reference chamber 25 drops noticeable against the registered reference pressure, it will result in a deflection of the diaphragm 30.

The annular tube wall 21 expires diaphragm 30 in longitude direction. Within the tube housing section 45 expiring the diaphragm 30 a positioning ring 46 is provided. Averted to the reference pressure chamber 25 onto the diaphragm 30 a permanent magnet 40 is placed. On the opposite side of the diaphragm 30 (within the pressure reference chamber 25) a small blade 42 of ferromagnetic material is attached to the diaphragm 30, By the magnetic gravitation of the permanent magnet 40 to the small blade 42 the magnet 40 will be held attached to the diaphragm 30 following its deflection.

The dimension of the protruding tube wall section 45 is limiting the lifting movements of the permanent magnet 40.

The permanent magnet 40 is able to be in a first position, corresponding to a neutral position of the diaphragm 30. Furthermore the permanent magnet 40 is able to come to a second lifted position, caused by a deflection of the diaphragm. The distance between the first and the second magnet position will be approx. 0,5 mm, this means that the lifting movement of the magnet is limited to approx. 0,5 mm. The permanent magnet 40 is preferably a body like a disc, attached with its main face to the diaphragm 30 and its end face is guided within the guiding ring 46. A thin disc with a diameter of 4 to 6 mm and thick about 1 to 2 mm of common used permanent magnet materials suits best. These kind of magnets are disposable on the market under the term measuring magnets. Preferably, the magnet 40 consists of powder metal of high coercive power embed in a plastic matrix. The magnet body at this state is magnetized in an axial direction.

The actual position of the magnet will be registered by a magnet field sensor 80, being placed in a separated handled hand checker 70 (compare FIG.3).

The hand checker 70 consists of a longish (preferably cylindrical bottle like) hand checker housing 71, with at least one measuring head 73, to which an attaching section is designed. This attaching section may be of an aluminum tube 74, showing a sufficient inner diameter constructed to slip onto the narrower, closed valve cap section 11 of the valve cap housing 10. The depth of the aluminum tube 11 fits to slip onto the whole narrower housing section 11. The destined figuration of the valve cap 10 relative to the hand checker 70 is executed as soon as the narrower housing section 11 enters into the aluminum tube 74 and the front side 75 of the aluminum tube 74 is attached to the annular graduation 12 of the valve cap housing 10.

In this special configuration the distance between the permanent magnet 40 and the magnet field sensor 80 is about 2,5 to 3 mm.

There are different, commonly used kinds of magnet field sensors possible for this purpose, registering the magnetic flow density and by this registering the distance between a magnet of a defined field strength. For example the use of inductive and capacitive working proximity sensors, or a Reed element is possible. Preferably a hall sensor will be used as a magnet field sensor, at this application preferably a hall effect position sensor. The hall sensor registers, whether there is a sufficient strong magnetic flow density within a measuring field of a width of several 0,1 mm or not. In the chosen applicated configuration this sufficient flow density is available, when the permanent magnet 40 is placed in its second, extended position adjacent to the closed valve housing end 11. The hall sensor 80 generates an output signal, being amplified and processed.

If otherwise under the same configuration the permanent magnet 40 is placed to its first position corresponding to the not deflected normal position of the diaphragm 30, the hall sensor 80 cannot register a sufficient flow density.

The hand checker 70 may contain additionally a positioning sensor 85, allowing to evaluate, whether the existing defined position of the valve cap housing 10 and the hand checker 70 is realized or not. The positioning sensor may execute a touching contact to the surface of the valve cap housing 10, or also without any touching, f.e. in a capacitive mode by registering the front side of the closed end 11 of the valve cap 10.

Preferably a Reed contact 85 will be used as a positioning sensor, reacting likewise to the magnet 40 into the valve cap 10 and generating a positive output signal independent of the position of the magnet, at the moment, the defined, 'correct' position of the valve cap 10 to the hand checker 70 is existent. The positive output signal will be indicated for example by a continuous green illuminated light-emitting diode 86 (LED). Furthermore a positive positioning signal activates automatically the measuring device, allowing the magnet field sensor 80 to register the actual position of the magnet 40. If the magnet field sensor registers the magnet in its first, normal position of the not deflected diaphragm 30, saying, that the actual checked pressure corresponds to this registered in the reference pressure chamber 25, meaning, that the prefilled pressure is still existent. To indicate this it is possible to use, f.e., a green flashing light-emitting diode 86. In the event, the magnet field sensor 80 registers the second position of the magnet, a second, red light-emitting diode 87 may illuminate. This signal allows the user to find out, if the actual tire pressure dropped for 0,1 bar or more in comparison to the 'registered' tire pressure. This allows a simple regular check of the tire pressure.

Inside the hand checker housing 71 a printed circuit board 82 is placed, to which the magnet field sensor 80, the positioning sensor 85 and the usual additional components are assembled to a switching and controlling electronic circuit. The output of the electronic circuit is connected to the two different light-emitting-diodes 86 and 87. The power supply is provided by a power source 89, f.e. a battey, or a rechargeable accumulator, situated replaceable in the interior of the hand checker.

In addition the hand checker may comprise of additional components and circuit applications, for example to check the condition of the used power source and/or the readiness for seduce of the magnet field sensor.

Figure 4:
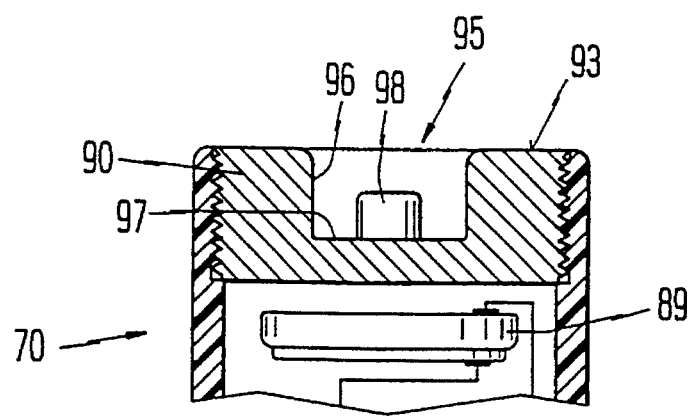
FIG. 4 . . . in section a chosen hand checker, showing at one end a template for a check of the standard of a mounted tire valve.

As demonstrated by FIG.4 the opposite end of the measuring head 73 may dispose of a plug inserted in the handchecker 70. Onto its frontside 93 a template for the test of a tire valve is placed to check, if a tire valve is according standards or not.

This template 95 exists of a bag shaped hole 96, with a bottom onto which an actuator member 98 is shaped for the testing of a valve.

If this template will be slipped onto a tire valve and the bag shaped hole 96 is fully attached, the actuator member 98 presses down the valve tappet and opens the tire valve, this will be registered by the hissing sound of the deflating air under pressure.

By unscrewing the cover plug 90 a simple change of the battery/batteries is possible. The template may also be constructed with a patched actuator member outside the cover plug, containing a hole to hold a key-ting.

FIG.5 shows another type of a hand checker 170, designed as a generally cylindrical housing 171, existing mainly of a first tube section 172 and a second tube section 175. The tube sections 172, 175 are made preferably of a resistant, metallic material, for example aluminum, aluminum alloy, brass, high grade steel, or similar. Housing section 175 shows two opposite end sections. One end section is made with an inner thread, into which it is possible to screw a replaceable cover 178. Into the other end section the first tube section 172 is inserted. A supporting ring 176 made of electric isolated material is fastened approx. centered between the two end sections onto the inner diameter of the second tube section 175. In the one casing between supporting ring 176 and cover 178 two battery cells (3 Volt Lithium batteries) 189, 189' are placed, switched in serial connection. In the other casing there is inserted a cylindrical, pressure loaded coil spring 177, which props with one spring end on the supporting ring 176 and with the other end on a front wall 160 of the first tube section 172. The protruding, free end section of the first tube section 172 is constructed as a measuring head 173. This measuring head 173 provides an attaching area for the defined adaptation of the valve cap 1, equipped with the permanent magnet 40. This attaching area is designed of an aluminum tube 174 with defined inner dimension, adapted to the outer dimension of valve cap 1 in a way, that a defined positioning of the measuring or permanent magnet 40 to the valve cap 1 is provided in relation to the magnet field sensor 180 of the measuring head 173. By this a two part housing 171 will be designed, whereby the housing parts 172, 175 are shifted collapsible like a telescope in an axial direction against the tension of the coil spring.

At the measuring head 173 a radial situated printed circuit board 182 is placed adjacent to the bottom of the aluminum tube 174. In the aluminum tube 174 an axial centered magnet field hall sensor 180 is placed adjacent to the printed circuit board 182. On the opposite side of the printed circuit board 182 a piezo-summer is assembled together with a control switch 184. On the other end section of the measuring head 173 the first tube section 172 is limited by a radial front wall 160, made of electric insulated material.

At this front wall 160 an axial, centered bore 162 is provided, being surrounded by a one unit tube 163, formed to the front wall 160. In this bore 162 and tube 163 a contact pin 164 is inserted, showing on one end a head 165 and on the other opposite base a disc 166, which is held in a distance to the front wall 160. This contact pin 164 plus head 165 and disc 166 are made of metallic, electrically conducting material.

The skin of the contact pin 164 is surrounded by a cylindrical, pressure loadable coil spring 167 (contact pin spring), being held with one spring end at the contact pin head 165 and with the other one at an annular shoulder of the front wall 160 limited by the bore 162.

Figure 6:
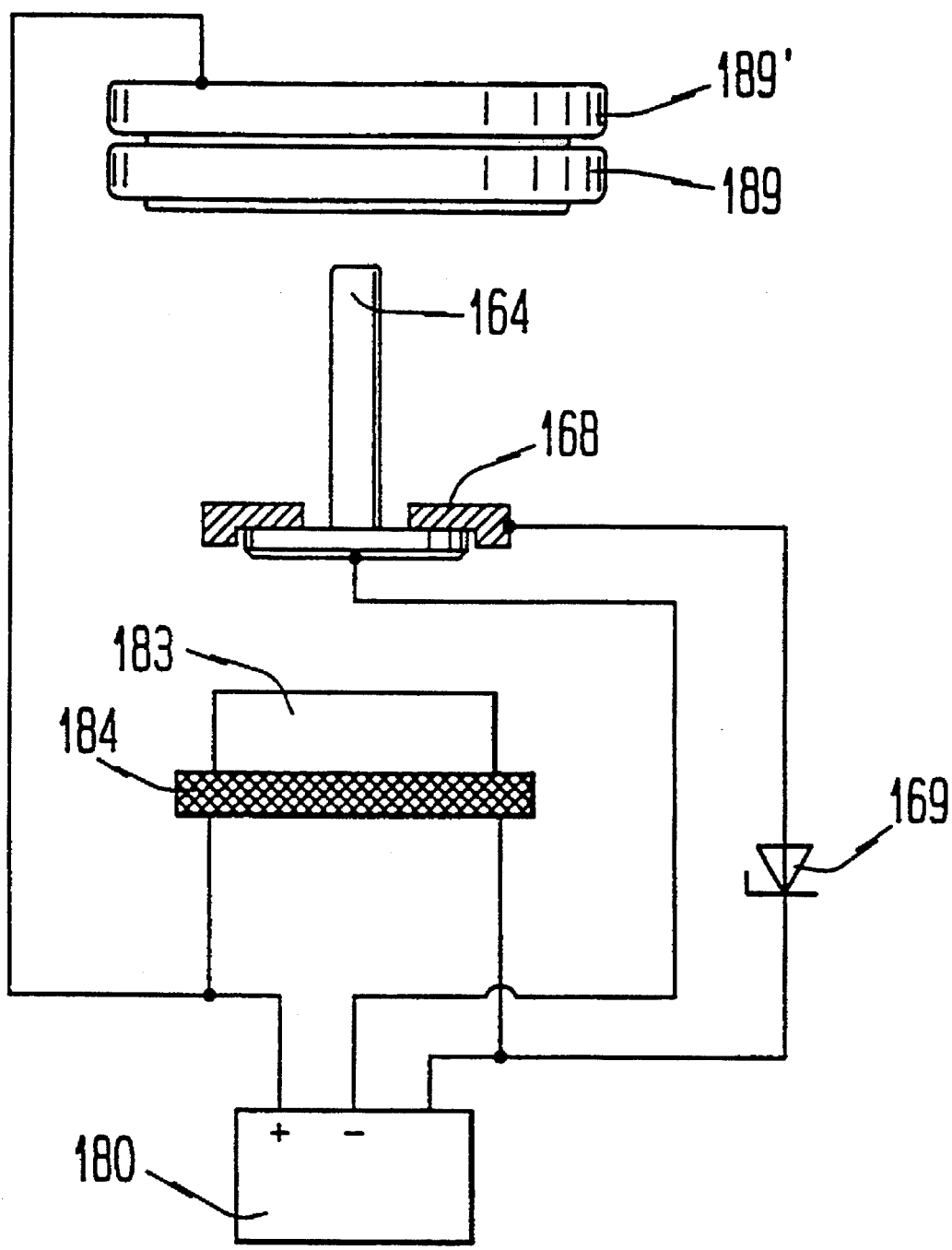
FIG. 6 a schematic switching diagram for the hand checker version according FIG. 5.

Intermediate the front wall 160 and the disc base 166 of the contact pin 164 a contact ring 168 is placed, being in an electrically conduction with the magnet field sensor 180 and the piezo summer 183 protected by a Zener Diode. (compare switching diagram FIG.6)

By the spring load of the coil spring 167 the rim of the disc of the contact pin base 166 will be held attached (and in electrically connection) to the contact ting 168. The contact ring 168 disposes of a direct, electric conducting connection to the energy consuming components (magnet field sensor 180, piezo summer 183, control switch 184, compare switching diagram according FIG.6)

In the following the use of the hand checker 170 will be described according FIG. 5:

At the most comfortable handling the larger tube section 175 of the housing 171 will be held by two fingers and brought to a position that the measuring head 173 can be slipped onto the adaptation area of the valve cap 1. After having placed the valve cap 1 into the metallic tube 174 of the measuring head 173 the movement of the larger tube section 175 will be continued in an axial direction towards the load of the spring in the hand checker attached to the valve cap 1.

The spring load of the coil spring 177 (measuring head spring) will shift the larger housing section 175 into the smaller housing section 172 collapsible like a telescope, in a way, that the smaller housing section 172 enters the larger housing section 175. By this will be made an electrical circuit between the bottom of the battery cell 189 and the contact pin head 165. By the disc of the contact pin base 166 attached to the contact ring 168 the magnet field sensor 180 and the piezo summer 183 are supplied with electric energy. In sequence the piezo sumer 183 generates an acoustic noticeable signal (first beeps). This 'stand by' signal confirms the functionality (sufficient power/power supply) of the hand checker 170 and will sound only, when (a) the functionality of the hand checker 170 is assured and (b) the valve cap 1 is correctly positioned to the measuring head 173 of the metallic tube 174.

When continuing the movement in an axial direction the larger tube section 175 will be blocked by the smaller tube section 172, towards the valve cap 1. The disc of the contact pin base 166 will be displaced from the contact ring 168. At this moment the power supply of the piezo summer 183 will be possible only by the direct electrically connection between contact pin 164 and the control switch 184 by this control switch 184 according the signal of the magnet field sensor 180. (compare switching diagram FIG. 6) Dependent on the position of the magnet 40 into the valve cap 1 the piezo summer 183 is able to generate a second noticeable acoustic signal (second kind of sound, for example a continuos beep), indicating a pressure loss of the checked tire. When removing the tube section 175 of the hand checker 170 and replacing the measuring head 173 from the valve cap 1, again a short 'stand by' signal will be heard, as soon as the disc of the contact pin base 166 is attached to the contact ring 168.

At the continued telescopic shifting apart of the larger tube section 175 from the small tube section 172 executed by the load of the coil spring, the contact between the contact pin 165 and the battery cell 189 will be disconnected. The energy supply of the power consuming components (piezo summer 183, control switch 184 and magnet field sensor 180) is interrupted again.

I claim:

1. A pressure drop-indicating system for a pnumatic tire having a tire valve, said system comprising a valve cap and a display unit, wherein said valve cap comprises a housing having an interior space defined by a closed end portion, an external wall and an internal wall section provided with a bore, and further having an open end portion defined by said internal wall section and by an internal thread means adapted for a screw-connection to the tire valve;

an actuator means attached to said internal wall section and extending in an axial direction for opening the tire valve when the open end portion is screwed onto the tire valve;

a deflectable diaphragm means arranged within the interior space and dividing said interior space into a first chamber, arranged between the closed end portion and the diaphragm means, and into a second chamber, arranged between the diaphragm means and the internal wall section, wherein the first chamber comprises a permanently-open flow connection with the tire valve via at least one non-closable flow channel recessed within the housing, and wherein the second chamber comprises a flow connection with the tire valve via the bore recessed in the internal wall section;

a sealing means sealing the open end portion with respect to the screw-connected tire valve and further hermetically sealing the bore within the internal wall section, such that, during a screw connection action, a given tire pressure is permanently enclosed, sealed and stored within the second chamber to serve as a reference pressure; and a permanent magnet movably arranged within the first chamber which is shiftable by the diaphragm means, and adapted to assume a first position distantly from the closed end portion when the diaphragm means takes its rest position, and a second position adjacent to the closed end portion when the diaphragm means takes its deflected position, whereby a pressure drop within the tire causes a similar pressure drop within the first chamber, such that the permanently-stored pressure within the second chamber becomes higher than the pressure within the first chamber and deflects and shifts the diaphragm means toward the closed end portion, and whereby said deflection of the diaphragm means moves the permanent magnet from its first position into its second position; and wherein said display unit comprises an arrangement section for engaging the valve cap, a magnetic field sensor means, at least one display means, a circuitry means connecting the sensor means with the display means, an electrical power supply means, and switching means for enabling the circuitry means and the sensor means;

wherein the display unit is formed as an independently usable hand-held device and is adapted by means of its arrangement section to engage the valve cap in a definite arrangement so that the magnetic field sensor means senses the first or second position of the permanent magnet, and the circuitry means triggers the display means accordingly.

2. The tire pressure drop-indicating system according to claim 1, wherein the distance between the first position and the second position of the permanent magnet is 0.2 to 0.9 mm.

3. The tire pressure drop-indicating system according to claim 2, wherein the distance is about 0.5 mm.

4. The tire pressure drop-indicating system according to claim 1, wherein the magnetic field sensor comprises a single-pole Hall effect position sensor.

5. The tire pressure drop-indicating system according to claim 1, wherein the valve cap housing is essentially formed like a cylindrical sleeve having a cylindrical external wall comprising a circumferential step portion so as to provide a closed end portion having a smaller diameter than the open end portion; and wherein the display unit comprises an elongated hand-held device having a front side, and wherein the arrangement section comprises a sleeve section formed at said front side and is adapted to encompass the closed end portion of the valve cap and to rest on the projecting circumferential step portion when the display unit is placed into the definite arrangement with respect to the valve cap.

6. The tire pressure drop-indicating system according to claim 5, wherein the display unit comprises a position control sensor sensing the definite arrangement and provides an output signal when the display unit takes the proper definite arrangement with respect to the valve cap.

7. The tire pressure drop-indicating system according to claim 6, wherein the proper definite arrangement of the display unit with respect to the valve cap is indicated by means of an optical or acoustic signal.

8. The tire pressure drop-indicating system according to claim 6, wherein a positive output of the position control sensor is a prerequisite for enabling the magnetic field sensor.

9. The tire pressure drop-indicating system according to claim 1, wherein the display means provides a YES or NO indication, indicating whether the actual tire pressure is similar to the reference pressure as stored within the second chamber or not.

10. The tire pressure drop-indicating system according to claim 1, wherein the display means comprises a plurality of light-emitting diodes differing in their colors.

11. The tire pressure drop-indicating system according to claim 1, wherein the display means comprises a piezo signal buzzer.

12. The tire pressure drop-indicating system according to claim 11, wherein the piezo signal buzzer generates a stand-by signal whenever a) a functional readiness for service of the display unit is provided; and b) in addition, the display unit is in its definite arrangement with respect to the valve cap.

13. The tire pressure drop-indicating system according to claim 1, wherein the display means comprises a housing made of two housing parts, wherein one housing part is adapted to be inserted telescope-like into the other housing part against a biasing force of a spring means.

14. The tire pressure drop-indicating system according to claim 13, wherein a mutual insertion of one housing part into the other housing part actuates a switching means enabling the power supply means to supply electrical power to the circuitry means and to other electric and/or electronic components of the display unit.

15. The tire pressure drop-indicating system according to claim 1, wherein the sealing means comprises a one-piece element which becomes deformed during the screwing action of the valve cap onto the tire valve; and wherein the deformed sealing means hermetically closes the bore recessed within the internal wall section.

16. The tire pressure drop-indicating system according to claim 1, wherein the display unit additionally comprises a gauge means for testing whether the tire valve corresponds to a standard valve or not.

17. The tire pressure drop-indicating system according to claim 16, wherein the gauge means comprises a pocket bore having a bottom wall, and further comprises an actuator means attached to said bottom wall; and wherein the tire valve comprises a tire valve tube having a front face; and wherein said tire valve tube is adapted to be introduced into said pocket bore until the front face engages the bottom wall.

18. The tire pressure drop-indicating system according to claim 17, wherein the display unit comprises an elongated hand-held device having a first front side comprising the arrangement section, and further comprises an opposite, second front side; and wherein the gauge means is formed at a plug means adapted to be screw-connected with said second front side.

* * * * *